United States Patent [19]
Wagner et al.

[11] Patent Number: 5,240,093
[45] Date of Patent: Aug. 31, 1993

[54] CONFIGURATION FOR THE PRESSURE SUPPLY TO AN AUTOMATIC SELECTOR DEVICE OF A CHANGE-SPEED GEARBOX

[75] Inventors: Gerhard Wagner, Remseck; Frank Tietze, Stuttgart, both of Fed. Rep. of Germany

[73] Assignee: Mercedes-Benz AG, Fed. Rep. of Germany

[21] Appl. No.: 889,274

[22] Filed: May 28, 1992

[30] Foreign Application Priority Data

May 30, 1991 [DE] Fed. Rep. of Germany ....... 4117736

[51] Int. Cl.⁵ ........................ B60K 41/22; F16D 25/11
[52] U.S. Cl. .................................. 192/3.58; 192/87.13
[58] Field of Search ................... 192/3.55, 3.57, 3.58, 192/87.1, 87.11, 87.13, 87.17, 87.18, 87.19; 74/335

[56] References Cited

U.S. PATENT DOCUMENTS

| | | |
|---|---|---|
| 3,274,858 | 9/1966 | Meyer et al. ............... 192/87.13 X |
| 3,352,392 | 11/1967 | Black et al. ................. 192/87.19 X |
| 4,723,643 | 2/1988 | Numazawa et al. ........... 192/3.58 X |
| 4,848,530 | 7/1989 | Chess .................................. 192/3.58 |
| 5,101,942 | 4/1992 | Prüss et al. ......................... 192/3.58 |

FOREIGN PATENT DOCUMENTS

| | | |
|---|---|---|
| 2744286 | 4/1979 | Fed. Rep. of Germany . |
| 2-107867 | 4/1990 | Japan ................................. 74/335 |

Primary Examiner—Richard M. Lorence
Attorney, Agent, or Firm—Evenson, McKeown, Edwards & Lenahan

[57] ABSTRACT

A pressure supply to an automatic selector device of a change-speed gearbox, controls working pressure via a multi-path valve device. The working pressure is supplied either only to clutch actuators of two drive clutches located in the force path before the change-speed gearbox or to selector actuators for the actuation of selector clutches producing the force path within the change-speed gearbox. The clutch actuator of one drive clutch is subjected to a load-dependent main pressure in the latter case.

12 Claims, 3 Drawing Sheets

5,240,093

CONFIGURATION FOR THE PRESSURE SUPPLY TO AN AUTOMATIC SELECTOR DEVICE OF A CHANGE-SPEED GEARBOX

BACKGROUND AND SUMMARY OF THE INVENTION

The present invention relates to a pressure supply configuration, and, more particularly, to a configuration for an automatic selector device of a change-speed gearbox.

In a known pressure supply configuration of the type shown in German Offenlegungsschrift 27 44 286 for a change-speed gear-box of the epicyclic type, two input shafts are each torsionally connected to an associated gearbox element while the selector apparatus, in the form of frictional selector brakes, are connected to the respective gear-box element used as the reaction element in an associated gear. Whereas one drive clutch located in the force path between the engine and the input shaft remains engaged in all forward gears, the second drive clutch located in the force path between the engine and the second input shaft is only engaged in the direct gear and in the reverse gear.

The two clutch actuators and the selector actuators, together with the main pressure system, the pressure control device and also a return conduit are, in the known configuration, directly connected to a multi-path rotary selector valve. In a first position, the selector valve connects the main pressure system to one of the drive clutches and the pressure control device to two selector actuators whereas, in a second position, the main pressure system is shut off and the pressure control device is connected both to the clutch actuator of the other drive clutch and to a selector actuator.

In contrast, a basic object of the present invention consists essentially in creating a pressure supply for a change-speed gearbox of the fixed axis type such that the working pressure of the clutch actuators can be controlled independently of the working pressure of the selector actuators and vice versa.

The foregoing object of the present invention has been achieved in an advantageous manner by connecting the multi-path device to the conduit system of the selector actuators via a collecting conduit leading to the selector valves for control of the working pressure of the selector actuators, and the collecting conduit is shut off in the second position of the multi-path device.

In the pressure supply configuration of the present invention, the pressure control device is, in the first position of the multi-path valve device, connected only to selector valves, while the clutch actuator of the drive clutch is connected to the main pressure system.

Another aspect of the present invention allows its application in a two-path gearbox with a second drive clutch which is accordingly connected to the return conduit in the first position of the multi-path valve device.

According to another feature of the present invention, a third position of the multi-path valve device is also provided for the holding phase of the second drive clutch, in which position the clutch actuator of this drive clutch is supplied with main pressure and the working selector valves are supplied with controlled pressure.

Other embodiments of the present invention use a second pressure control device for the second drive clutch and pressure valves and directional valves in the pressure supply configuration.

BRIEF DESCRIPTION OF THE DRAWINGS

These and other objects, features and advantages of the present invention will become more apparent from the following detailed description of a preferred embodiment when taken in conjunction with the accompanying drawings wherein.

DETAILED DESCRIPTION OF THE DRAWINGS

Figure 5:
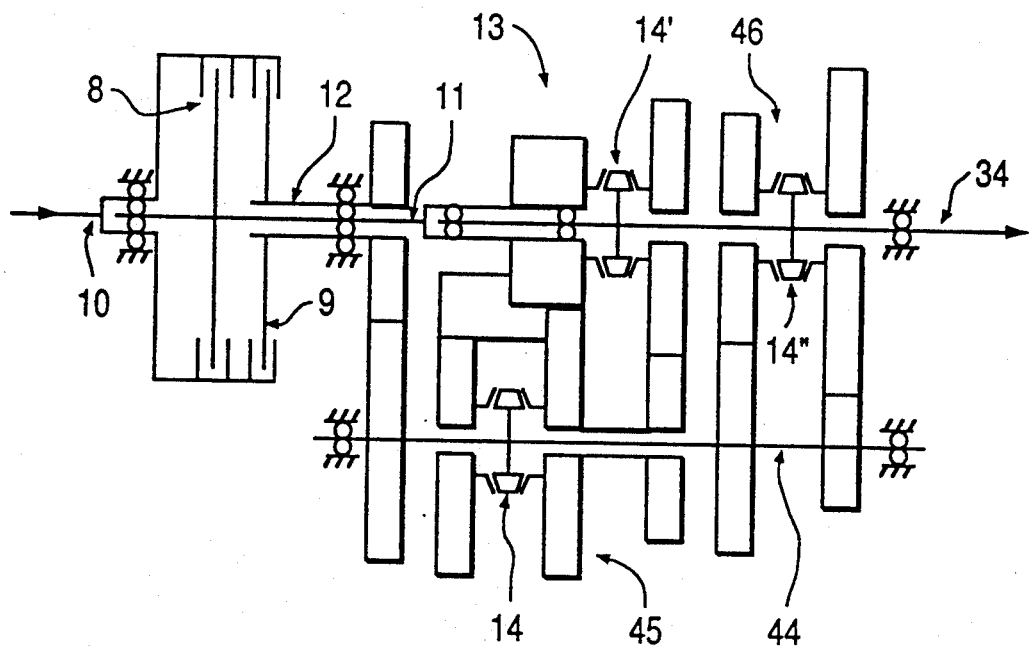
FIG. 5 shows a diagram of a twin-path gearbox which can be operated by the selector device of FIG. 1.

In the twin-path gearbox 13 of FIG. 5, a drive shaft 10, driven by an engine in a known manner, can be connected to respective input shafts 11, 12 by two respective drive clutches 8, 9 which can be operated under load. The input shaft 11 is part of a first partial gearbox 45 whose output end can be brought into drive connection with an idler shaft 44 or with an output shaft 34 by way of respective selector clutches 14 and 14. The other input shaft 12 drives, via a gearwheel stage, the idler shaft 44, which is common to the first partial gearbox 45 and a second partial gearbox 46, the latter being connected at the output end to the output shaft 34 by a further selector clutch 14".

The drive clutches 8, 9 can each be actuated by respective clutch actuators 6, 7 (FIG. 1), i.e. they can be engaged by a working pressure force and disengaged by spring force. The selector clutches 14' and 14" can each be respectively actuated by a respective selector actuator 15' and 15" of the axial piston type either into a driveless central position or into two gear positions located opposite to one another relative to the central position. The construction, function and gear selection details of the twin-path gearbox 13 shown in FIG. 5 are not the subject matter of the invention, and therefore any further detailed description thereof is not necessary.

The three positions of each of the selector actuators 15' and 15" are controlled by a respective 5/3-way selector valve 22', 22". The central valve position is selected by spring force in each case, and the two other valve positions are selected by a control pressure force of a respective control pressure conduit 48 connected to a multi-path selector control valve 42 of the rotary valve type which is actuated by an electric stepper motor 47 which is, in turn, controlled by an electronic control unit 43.

The conduit system 20 of the selector actuators 15' and 15", which also includes working pressure conduits (not shown) between the respective selector valve 22', 22" and the associated selector actuator 15', 15" additionally includes a working pressure collecting conduit 21 which connects the selector valves 22 to a 9/2 multi-path valve 39 of a multi-path valve device 19 to which are also connected the clutch actuators 6, 7.

The multi-path valve device 19 also has an 11/2 multi-path valve 27 to which are connected a main pressure system 16, two pressure control devices 17, 24 and 18, 25, and a return conduit 23. The two multi-path valves 27 and 39 are connected together by six pressure-medium connections 28 to 33. The two multi-path valves 27 and 39 can be respectively driven by spring force into zero positions $27_0$ and $39_0$ and into their second positions $27_1$ and $39_1$ by electromagnetic 3/2-way control valves 40, 41 respectively.

The first pressure control device 17, 24 has a pressure control shut-off valve 24 connected to the main pressure system 16, which carries an engine-load dependent main pressure. The pressure control shut-off valve 24 is connected to the multi-path valve 27 by a pressure conduit 35 and has pilot control via a pressure control valve 17 which is fed by a control pressure collecting conduit 26 and is activated by the control unit 43 via an electromagnetic actuator 37.

The second pressure control device 18, 25 has a corresponding pressure control shut-off valve 25 which is connected to the main pressure system 16 and is connected to the multi-path valve 27 via a pressure conduit 36. The pressure control shut-off valve 25 has pilot control via a pressure control valve 18 which is fed from the control pressure collecting conduit 26 and can be controlled by the control unit 43 via an electromagnetic actuator 38.

Figure 1:
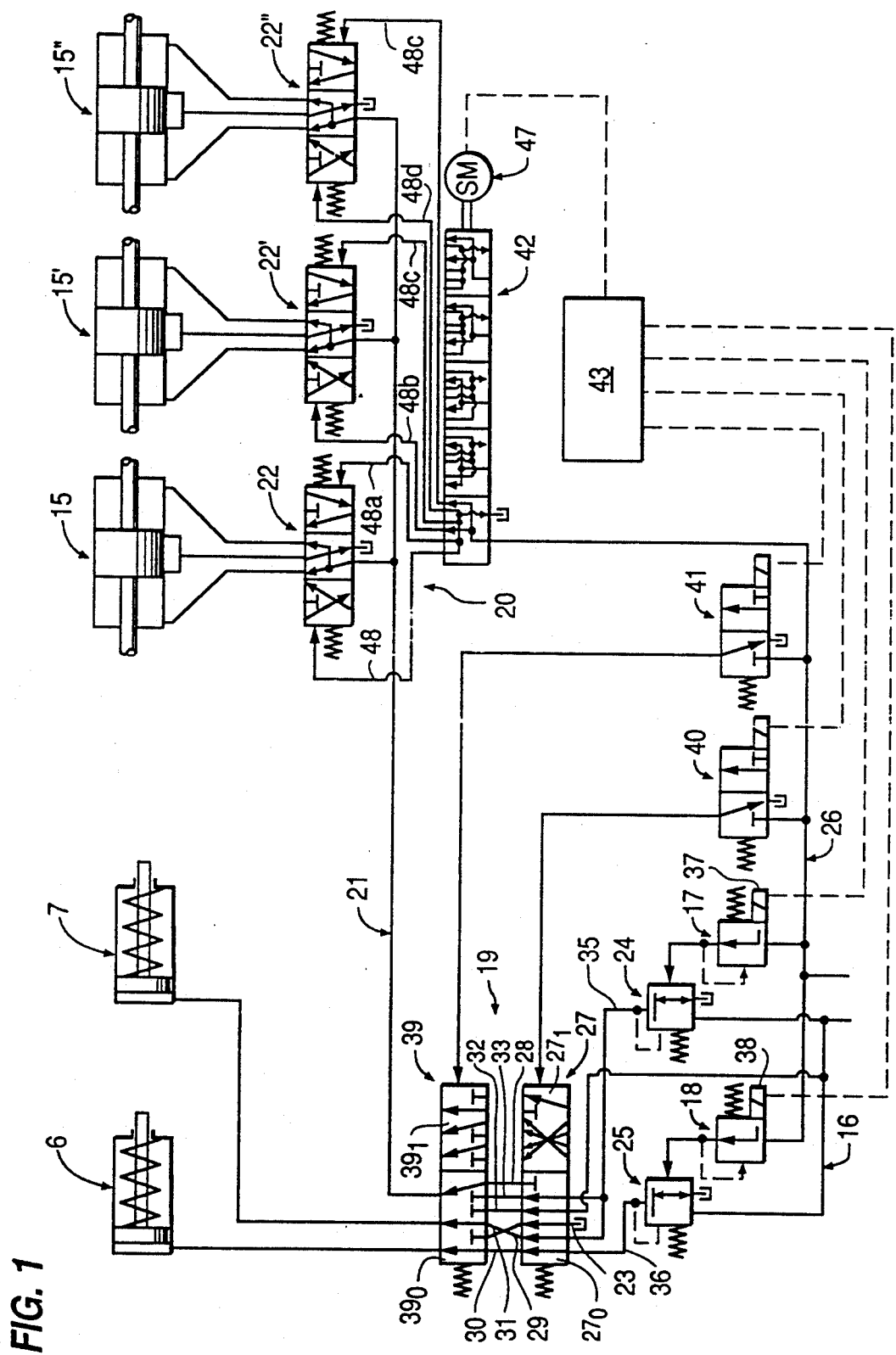
FIG. 1 is a hydraulic block circuit diagram of an automatic selector device of a twin-path toothed-wheel, change-speed gearbox with pressure supply configuration according to the present invention.

In FIG. 1, the multi-path valve device 19 is in a condition which can be described as the fourth position, in which both multi-path valves 27 and 39 are brought by spring force into their zero positions $27_0$ and $39_0$, respectively, because the associated pilot-control valves 40 and 41 are not excited and are, therefore, also in their zero position. As a result, the first clutch actuator 6 is connected to the pressure control shut-off valve 25 of the second pressure control device 18, 25 via the pressure-medium connection 30 and the pressure conduit 36; the second clutch actuator 7 is connected to the pressure control shut-off valve 24 of the first pressure control device 17, 24 via the pressure-medium connection 31 and the pressure conduit 35; the main pressure system 16 is shut off by the closed pressure-medium connection 32; the working pressure collecting conduit 21 is shut off by the closed pressure-medium connection 28; and the return conduit 23 is similarly shut off by the closed pressure-medium connection 29.

Because of these valve positions, a separate control of the particular working pressure in the clutch actuators 6 and 7 can take place by the control unit 43 during a gear-change phase—i.e. during a change between the drive clutches 8, 9.

Figure 3:
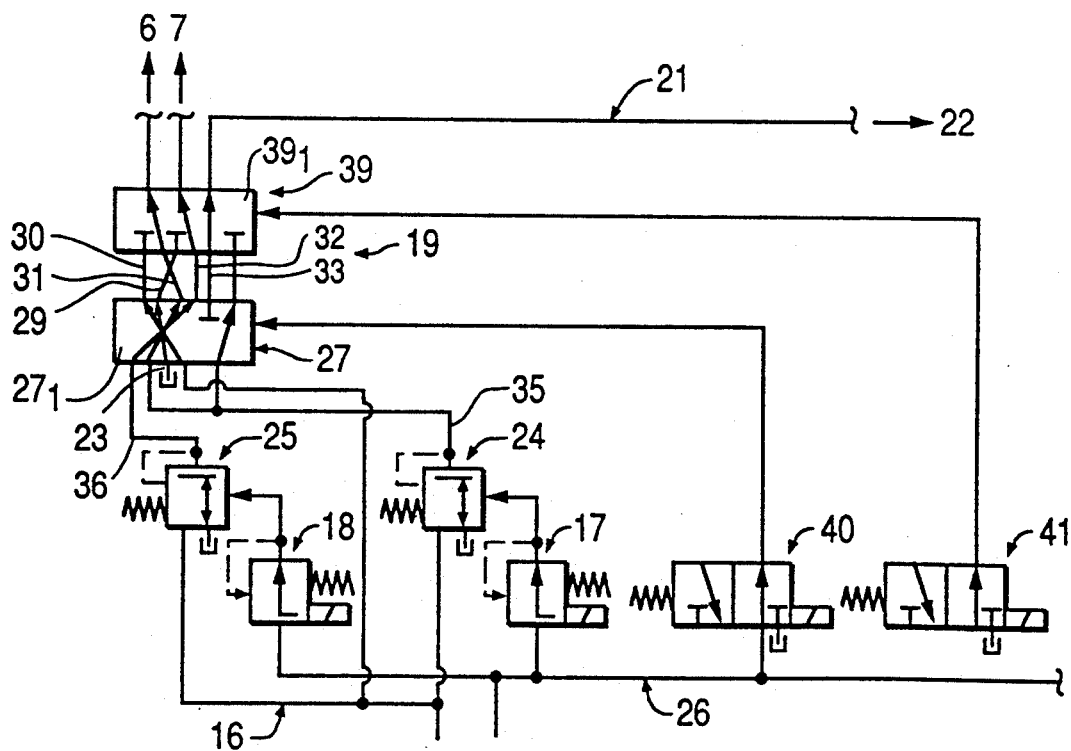
FIG. 3 shows the pressure supply configuration of FIG. 1 in still a further position.

This separate pressure control for the two clutch actuators 6, 7 is also possible, as shown in FIG. 3, in a condition of the multi-path valve device 19 designated here as the second position, in which both multi-path valves 27 and 39 are driven into the respective second positions $27_1$ and $39_1$ by excitation of the respectively associated 3/2-way control valve 40 or 41. In this condition, the first clutch actuator 6 is connected to the first pressure control device 17, 24 via the pressure-medium connection 29 and the pressure conduit 35; the second clutch actuator 7 is connected to the second pressure control device 18, 25 via the pressure-medium connection 32 and the pressure conduit 36; the main pressure system 16 is shut off by the closed pressure-medium connection 30; the return conduit 23 is shut off by the closed pressure-medium connection 31; and the working pressure collecting conduit 21 is similarly shut off by the closed pressure-medium connection 33.

Figure 2:
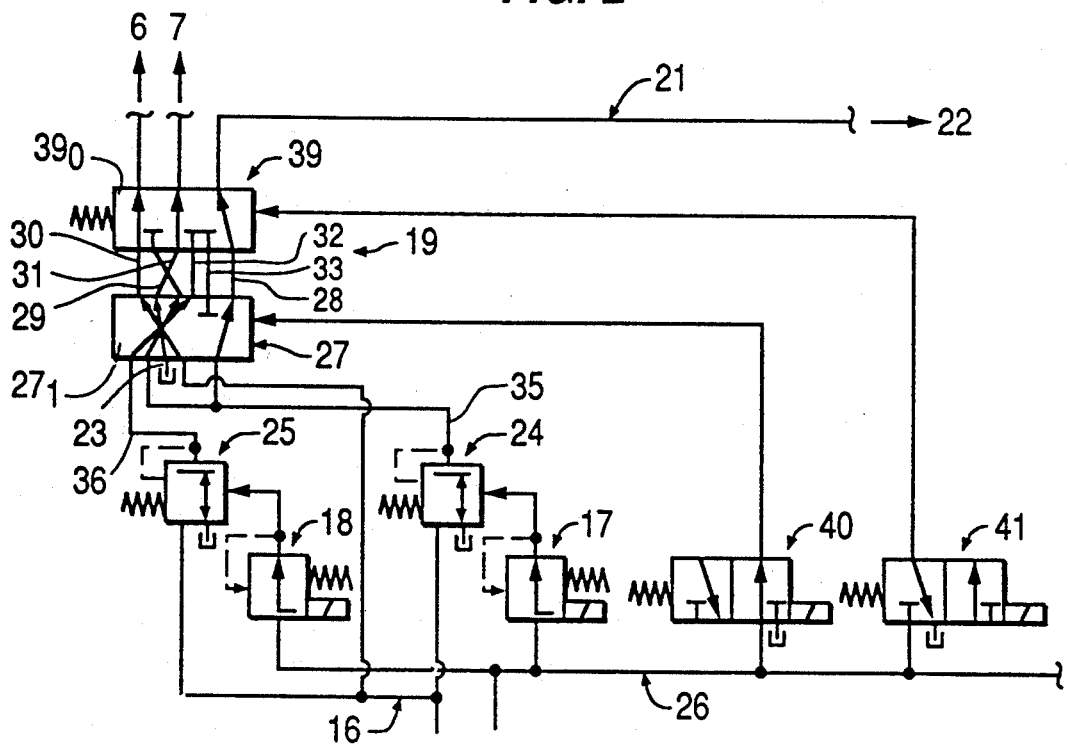
FIG. 2 shows the pressure supply configuration of FIG. 1 in another position.

In FIG. 2, the multi-path valve device 19 is located in a condition designated as the first position $27_1$, $39_0$, in which the pilot control valve 40 is excited and, consequently, the multi-path valve 27 is switched into its position $27_1$ while the pilot control valve 41 and the multi-path valve 39 remain in their respective zero positions. As a result, the clutch actuator 6 is connected to the main pressure system 16 via the pressure-medium connection 30; the clutch actuator 7 is connected to the return conduit 23 via the pressure-medium connection 31; the working pressure collecting conduit 21 leading to the selector valves 22', 22'' is connected to the first pressure control device 17, 24 via the pressure-medium connection 28 and the pressure conduit 35; and the second pressure control device 18, 25 is shut off by the closed pressure-medium connection 32. Consequently, the clutch actuator 6 is located in the steady-state holding phase during which a controlled working pressure can be supplied to the selector valves 22', 22''.

Figure 4:
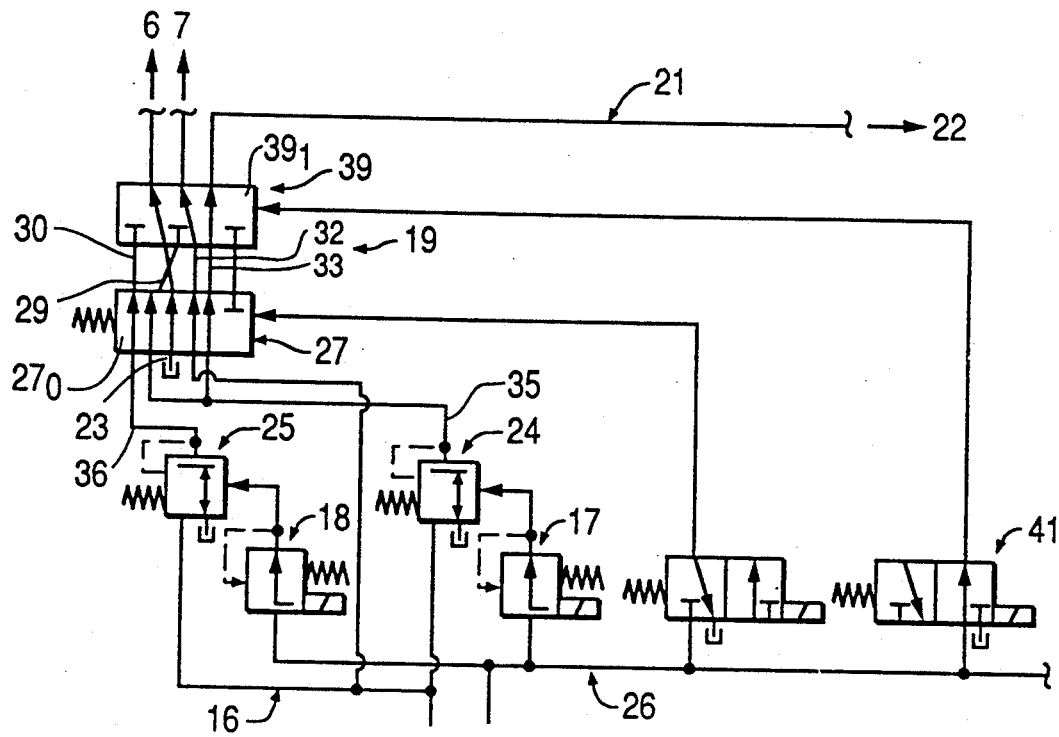
FIG. 4 shows the pressure supply configuration of FIG. 1 in yet a further position.

Finally, the multi-path valve device 19 can also be brought by excitation of the pilot valve 41 into a condition, shown in FIG. 4 and designated as the third position, in which the multi-path valve 27 is in its zero position $27_0$ and the multi-path valve 39 is in its excited position $39_1$. Hence, the clutch actuator 6 is connected to the return conduit 23 via the pressure-medium connection 29; the clutch actuator 9 is connected to the main pressure system 16 via the pressure-medium connection 32; the working pressure collecting conduit 21 leading to the selector valves 22', 22'' is connected to the first pressure control device 17, 24 via the pressure-medium connection 33 and the pressure conduit 35; and the second pressure control device 18, 25 is shut off by the closed pressure-medium connection 30.

In this third condition or position, therefore, the other clutch actuator 7 is located in its holding phase during which a controlled working pressure can again be supplied to the selector valves 22', 22''.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An apparatus for pressure supply to an automatic selector device of a change-speed gearbox having a clutch actuator, a drive clutch actuatable by the clutch actuator and located in a force path between an engine and an input shaft of the change-speed gearbox, selector actuators for actuating engageable and disengageable selector means to form a force path between the input shaft and an output shaft of the change-speed gearbox, the pressure supply apparatus comprising a main pressure system for generating a main pressure, a pressure control device for producing a modulated working pressure for the clutch actuator and the selector actuators from the main pressure in dependence on an electronic control unit, and a multi-path valve device switchable among multiple paths in dependence on the control unit, and connected to the main pressure system, the pressure control device, the clutch actuator and to a conduit system of the selector actuators whereby, in a first position of the multi-path valve device, the clutch actuator is connected to the main pressure system and a part of the conduit system of the selector actuators is connected to the pressure control device whereas, in a second position of the multi-path valve device, the main pressure system is shut off and the clutch actuator is connected to the pressure control device, wherein the multi-path valve device is connected to the conduit system of the selector actuators via a working pressure collecting conduit leading to selector valves for control of the working pressure of the selector actuator, and the collecting conduit is arranged to be shut off in the second position of the multi-path valve device.

2. The apparatus according to claim 1, wherein a second drive clutch is located in a force path between the engine and a second input shaft of the change-speed gearbox and is actuatable by an associated second clutch actuator, the multi-path valve device is connected to a pressure-relieved return conduit and to the second clutch actuator, and the second clutch actuator is connected to the return conduit in the first position of the multi-path valve device.

3. The apparatus according to claim 2, wherein the multi-path valve device is arranged to have a third position in which the second clutch actuator is connected to the main pressure system, the collecting conduit is connected to the pressure control device and the first clutch actuator is connected to the return conduit.

4. The apparatus according to claim 2, wherein the multi-path valve device is connected to a second pressure control device which, in dependence on the electronic control unit, provides a modulated working pressure from the main pressure, and the second clutch actuator is connected to the second pressure control device in the second position of the multi-path valve device.

5. The apparatus according to claim 4, wherein the multi-path valve device is arranged to have a fourth position in which the first clutch actuator is connected to the second pressure control device, the second clutch actuator is connected to the first pressure control device and the main pressure system, the return conduit and the collecting conduit are shut off.

6. The apparatus according to claim 4, wherein at least one of the pressure control devices has a pressure control shut-off valve and a pressure control valve for pilot control of the pressure control shut-off valves, and the pressure control shut-off valve is located in a pressure conduit connecting the main pressure system to the multi-path valve device, and the pressure control valve is actuatable by a valve actuator dependent on the control unit.

7. The apparatus according to claim 6, wherein at least one of the pressure control valves is connected to a control pressure supply conduit.

8. The apparatus according to claim 6, wherein the multi-path valve device includes a 9/2 multi-path valve and an 11/2 multi-path valve which is connected, on one hand, to the main pressure system, the pressure control shut-off valves and the return conduit, and is connected, on the other hand, to the 9/2 multi-path valve by six pressure-medium connections, with the clutch actuators and the working pressure collecting conduit leading to the selector valves being connected to the 9/2 multi-path valve.

9. The apparatus according to claim 8, wherein the multi-path valves each have a spring-selectable zero position.

10. The apparatus according to claim 9, wherein the multi-path valves are configured to be switchable over into another position by electromagnetically actuatable 3/2-way control valves.

11. The apparatus according to claim 10, wherein the 3/2-way control valves are connected to the control pressure supply conduit.

12. The apparatus according to claim 7, wherein a multi-path selector control valve is connected to the control pressure supply conduit, and control pressure conduits connect the multi-path selector control valve to the selector valves.

* * * * *